Patented Apr. 29, 1941

2,240,415

UNITED STATES PATENT OFFICE 2,240,415

SPONGE RUBBER AND METHOD OF PRODUCING THE SAME

Paul G. Peik, Detroit, Mich., assignor to Emulsions Process Corporation, New York, N. Y., a corporation of Delaware No Drawing. Application October 5, 1939, Serial No. 298,160

5 Claims. (Cl. 260—723)

This invention relates to sponge rubber, and a method of producing the same, and the present application is a continuation-in-part of my application Serial No. 230,709, filed Sept. 19, 1938.

In my prior application I have disclosed, among other things, a sponge rubber which retains all the original life and nerve of the rubber due to the elimination of excessive mastication necessary in the prior art. Such sponge rubber has the appearance of solid rubber, both on the surface and in cross section, on account of the microscopically small cells formed by the microscopic dispersion of water in the emulsion, from which the sponge rubber is formed, prior to curing.

In the manufacture of sponge rubber, as disclosed in my prior application, it has been found desirable for certain uses, particularly for sound deadening purposes, to retain the water in the cells. Therefore, it is the primary object of the present invention to achieve this end.

The exact nature of the invention, together with further objects and advantages thereof will be apparent from the following description.

I have found that by the introduction of a proper hygroscopic agent into the emulsion, the desired result can be accomplished. For example, if a proper quantity of glycerine is mixed with the water before it is dispersed in the rubber solution or composition (disclosed in the above numbered application), the water will be retained indefinitely instead of progressively evaporating off. If no hygroscopic agent is used, sponge rubber having water impounded therein, and made in accordance with my prior invention, is liable to lose the water by evaporation over a prolonged period of time, and such loss may be sufficient to cause shrinkage and distortion which may make the product without my new treatment unsuitable for sound deadening purposes. For example, without the treatment of the present process, the sponge rubber panels as prepared for sound deadening, and applied to the inner surface of auto body panels, may gradually shrink and eventually curl, which is objectionable.

In preparing a suitable sponge for sound deadening, according to my above application, I subject suitable proportions of water and a rubber cut-back or the like to violent impact, turbulence and shear, whereby the water is uniformly dispersed throughout the rubber in fine sub-divisions so as to form a water-in-oil type emulsion which is subsequently vulcanized at a temperature substantially below the boiling point of water, to produce a sponge rubber article. Suitable gases may be added during the emulsifying step, and comminuted aggregates may be introduced into the emulsion before vulcanization. In practicing the invention disclosed in such application, I have found that a rubber cement composed of .75 of a pound of virgin rubber, such as smoke sheets, dispersed in a gallon of a suitable solvent such as naphtha, produces a very efficient deadener when water is dispersed therein in the ratio of two volumes of cement to one volume of water. I have also found that such water will be retained indefinitely in the sponge if the water is mixed with glycerine in an amount of approximately 3% of glycerine by weight on the water.

I do not wish to confine myself to the above proportions, as the amount will vary, that is, the amount of glycerine varies as the amount of water is varied or as the type of rubber and solvent used is varied. For instance, in the above formula, if the amount of glycerine is increased to 6% on the water, further absorption of water out of the atmosphere will occur, causing the sponge rubber deadener to remain permanently wet and unfit for use because the wet rubber panel militates against the effectiveness of adhesion. When less than 3% of glycerine is used, evaporation of water occurs until the condensation is 3%, that is, the concentration of the glycerine, when no further change in the water content occurs, as already explained.

Obviously, other hygroscopic agents may be effective, such as calcium chloride, and while these are not as preferable as glycerine, I believe that the use of any suitable hygroscopic agent to retain water in sponge rubber as disclosed in my prior application, would come within the scope of the present invention, so long as it is used in an amount that will maintain the material in equilibrium.

From the foregoing it is believed that the invention and the advantages thereof may be readily understood by those skilled in the art, and I am aware that changes may be made in the details and the proportions mentioned without departing from the spirit of the invention as expressed in the claims.

What I claim and desire to secure by Letters Patent is:

1. Vulcanized sponge rubber having uniformly distributed microscopic cells containing water having a hygroscopic agent incorporated therein, the hygroscopic agent being present in an amount which will retain the water in the sponge rubber but will not absorb water out of the atmosphere, whereby the sponge rubber possesses a dry surface.

2. A method of the character described, comprising producing a water in oil type emulsion of dispersed rubber having a hygroscopic agent incorporated therein, the hygroscopic agent being present in an amount which will retain the water but insufficient to absorb water out of the atmosphere, and then heat treating the emulsion and thereby vulcanizing the same under such conditions as to prevent the water from vaporizing.

3. A vulcanized sponge rubber comprising the following ingredients present in substantially the following proportions: rubber cement composed of .75 of a pound of virgin rubber dispersed in one gallon of a rubber solvent, water, the ratio of the cement to water being two to one, and glycerine, the glycerine being present in an amount of 3% of glycerine by weight on the water.

4. Vulcanized sponge rubber having uniformly distributed microscopic cells containing water having glycerine incorporated therein, the glycerine being present in an amount which will retain the water in the sponge rubber but will not absorb water out of the atmosphere, whereby the sponge rubber possesses a dry surface.

5. Vulcanized sponge rubber having uniformly distributed miscroscopic cells containing water having calcium chloride incorporated therein, the calcium chloride being present in an amount which will retain the water in the sponge rubber but will not absorb water out of the atmosphere, whereby the sponge rubber possesses a dry surface.

PAUL G. PEIK.